United States Patent [19]

Minamida

[11] Patent Number: 4,512,427
[45] Date of Patent: Apr. 23, 1985

[54] COMBINATORIAL WEIGHING METHOD AND APPARATUS

[75] Inventor: Kazukiyo Minamida, Shiga, Japan

[73] Assignee: Kabushiki Kaisha Ishida Koki Seisakusho, Kyoto, Japan

[21] Appl. No.: 590,356

[22] Filed: Mar. 16, 1984

[30] Foreign Application Priority Data

Mar. 17, 1983 [JP]  Japan ................. 58-044811

[51] Int. Cl.³ ............. G01G 19/00; G01G 19/22
[52] U.S. Cl. ........................... 177/1; 177/25; 177/50
[58] Field of Search ............... 177/1, 25, 50, DIG. 12

[56] References Cited

U.S. PATENT DOCUMENTS

| | | | |
|---|---|---|---|
| 4,441,567 | 4/1984 | Hirano | 177/DIG. 12 |
| 4,466,499 | 8/1984 | Minamida et al. | 177/1 |
| 4,470,166 | 9/1984 | Hirano | 177/1 |

Primary Examiner—E. A. Goldberg
Assistant Examiner—Patrick W. Foster
Attorney, Agent, or Firm—Staas & Halsey

[57] ABSTRACT

A combinatorial weighing method and apparatus for providing a total weight value within set allowable limits even if weight values produced by weighing machines fluctuate due to externally applied vibration or the like. The method includes obtaining an optimum combination by performing combinatorial processing using weight values produced by the weighing machines at a predetermined first point in time following introduction of articles into the weighing machines. Then the total weight of the obtained optimum combination is recalculated by using weight values read from the weighing machines again at a second point in time. It is determined whether the recalculated total weight value of the optimum combination lies within the set allowable limits, and the articles are discharged from those weighing machines corresponding to the optimum combination if the recalculated total weight value lies within the set allowable limits.

9 Claims, 5 Drawing Figures

COMBINATORIAL WEIGHING METHOD AND APPARATUS

BACKGROUND OF THE INVENTION

This invention relates to a combinatorial weighing method and apparatus for weighing out agricultural products such as green peppers and potatoes, lifestock foodstuffs such as meat and broilers, perishable foods, fruits and fabricated parts. More particularly, the invention relates to a combinatorial weighing method and apparatus wherein a combination giving a total weight value within set allowable limits can be obtained in a short period of time even if a weight value, produced as an output by a weighing machine, fluctuates due to vibration or the like.

According to a combinatorial weighing apparatus which is known in the art, combinatorial weighing is carried out by weighing articles which have been introduced into a plurality of weighing machines, forming combinations of the weight values from the weighing machines, obtaining a combination (referred to as the "optimum combination") the total weight of which is equal to a target weight value or closest to the target weight value within set allowable limits, discharging the articles from the machines belonging to the combination obtained, subsequently replenishing the weighing machines which have discharged their articles with additional articles in order to prepare for the next combination, and continuing automatic weighing by repeating the foregoing operations.

In a combinatorial weighing apparatus of the foregoing type, a weight value from a weighing machine ordinarily stabilizes at a predetermined time $t_0$ after introduction of the articles into the weighing machine. Accordingly, the weight value is read at a predetermined time $t_1$ following stabilization to enable combinatorial processing at high precision. It should be noted, however, that the weighing machine output (weight value) will be unstable even at time $t_1$, as shown in FIG. 2, if the articles are supplied to the weighing machine in a single mass, rather than as a steady flow, or if the weighing machine is subjected to external applied vibration. In such case, reading the weight value from the weighing machine at time $t_1$, obtaining an optimum combination by performing a combinatorial computation using the weight value, and discharging the articles from the weighing machines belonging to the combination may result in a batch of discharged articles having a total weight which is outside the set allowable limits, namely a total weight which is too low or too high.

If a solution to the foregoing problem is sought by delaying the reading of the weight value in order to prevent the weighing apparatus from discharging a batch of articles outside the set allowable limits, the moment at which combinatorial processing starts will be delayed correspondingly. This would make it impossible to carry out combinatorial weighing at high speed.

SUMMARY OF THE INVENTION

An object of the present invention is to provide a novel combinatorial weighing method and apparatus wherein a combination of weighing machines giving a total weight value within set allowable limits can be obtained in a short period of time even if an output value produced by a weighing machine fluctuates due to the influence of externally applied vibration.

According to the present invention, the foregoing object is attained by a combinatorial weighing method, as well as an apparatus for practicing the method, which includes reading output values (weight values) Wi from weighing machines at a predetermined time following introduction of articles to the weighing machines, obtaining an optimum combination by performing combinatorial processing using Wi (i=1, 2 . . . ), thereafter reading the weight values again, as weight values Wi', at a time when the output values of the weighing machines are stable, adding the weight values Wi' on the basis of the optimum combination, determining whether the total weight value of the combination is within set allowable limits, and discharging the articles from the weighing machines belonging to the combination if the total weight thereof is within the allowable limits.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 3:
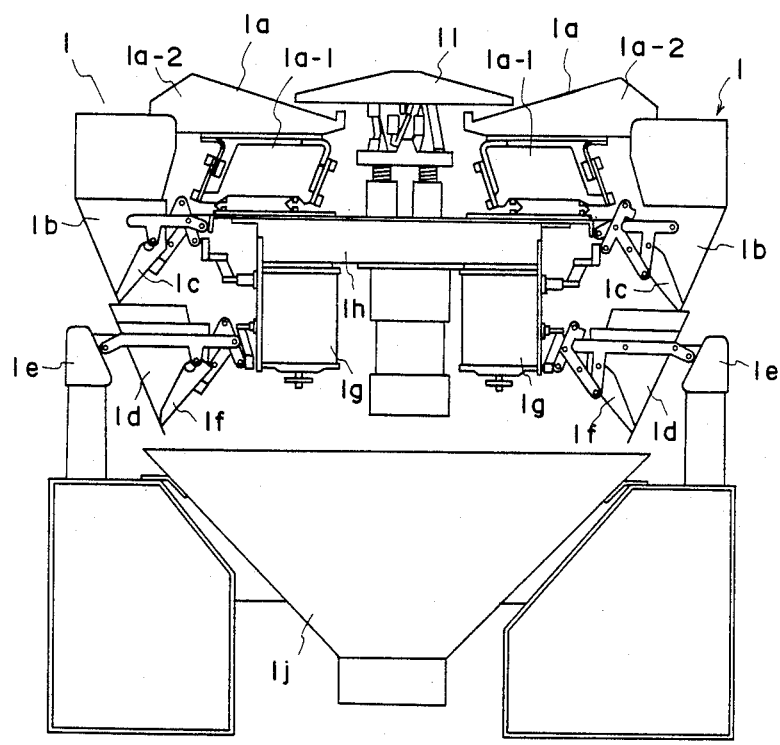
FIG. 3 is a schematic diagram of the mechanism of a combinatorial weighing apparatus to which the present invention can be applied.

Reference will first be had to FIG. 3 to describe the mechanism of a combinatorial weighing apparatus to which the present invention appertains. Numeral 11 denotes a dispersing table of vibratory conveyance-type. Articles to be weighed are introduced onto the dispersing table 11 and imparted with vibratory motion for a predetermined length of time so as to be dispersed radially outward from the center of the table. Numerals 1, . . . 1 denote n-number of weighing stations which are arranged around the dispersing table 11 along radially extending lines to receive the articles dispersed by the table. Each weighing station includes a dispersing feeder 1a, a pool hopper 1b, a pool hopper gate 1c, a weighing hopper 1d, a weight sensor 1e, a weighing hopper gate 1f, and a hopper drive unit 1g. Each weighing hopper 1d and weight sensor 1e constitute a weighing machine. The dispersing feeders 1a are arranged radially on a support platform 1h so as to surround the dispersing table 11, and each includes an electromagnetic vibrator 1a-1 and a trough 1a-2. Articles supplied to the trough 1a-2 from the dispersing table 11 fall into the corresponding pool hopper 1b from the end of the trough due to the linear reciprocating motion of the electromagnet 1a-1. The pool hopper gate 1c, which is provided on the respective pool hopper 1b, is opened under the control of a hopper drive unit 1g, whereupon the articles contained in the pool hopper 1b are released into the corresponding weighing hopper 1d. Each of the weight sensors 1e attached to a respective one of the weighing hoppers 1d, is operable to measure the weight of the articles introduced into the corresponding weighing hopper, and to apply an electrical signal indicative of the measured weight to a combination processing unit. The combination processing unit then obtains the optimum combination by performing processing for combinatorial weighing. The hopper drive unit 1g is adapted to open only the weighing hopper gates of those weighing machines that give the optimum combination, whereby the articles contained in these weighing machines are discharged into a common chute 1j where they are collected together. The collecting chute 1j has the shape of a conical or polygonal funnel and is so arranged as to receive the articles from any of the circularly arrayed weighing hoppers 1d via the weighing hopper gates, which are located above the funnel substantially along its outer rim. The articles received by the collecting chute 1j are collected at the centrally located lower end thereof by falling under their own weight or by being forcibly shifted along the inclined wall of the funnel by a mechanical scraper of the like (not shown).

Figure 4:
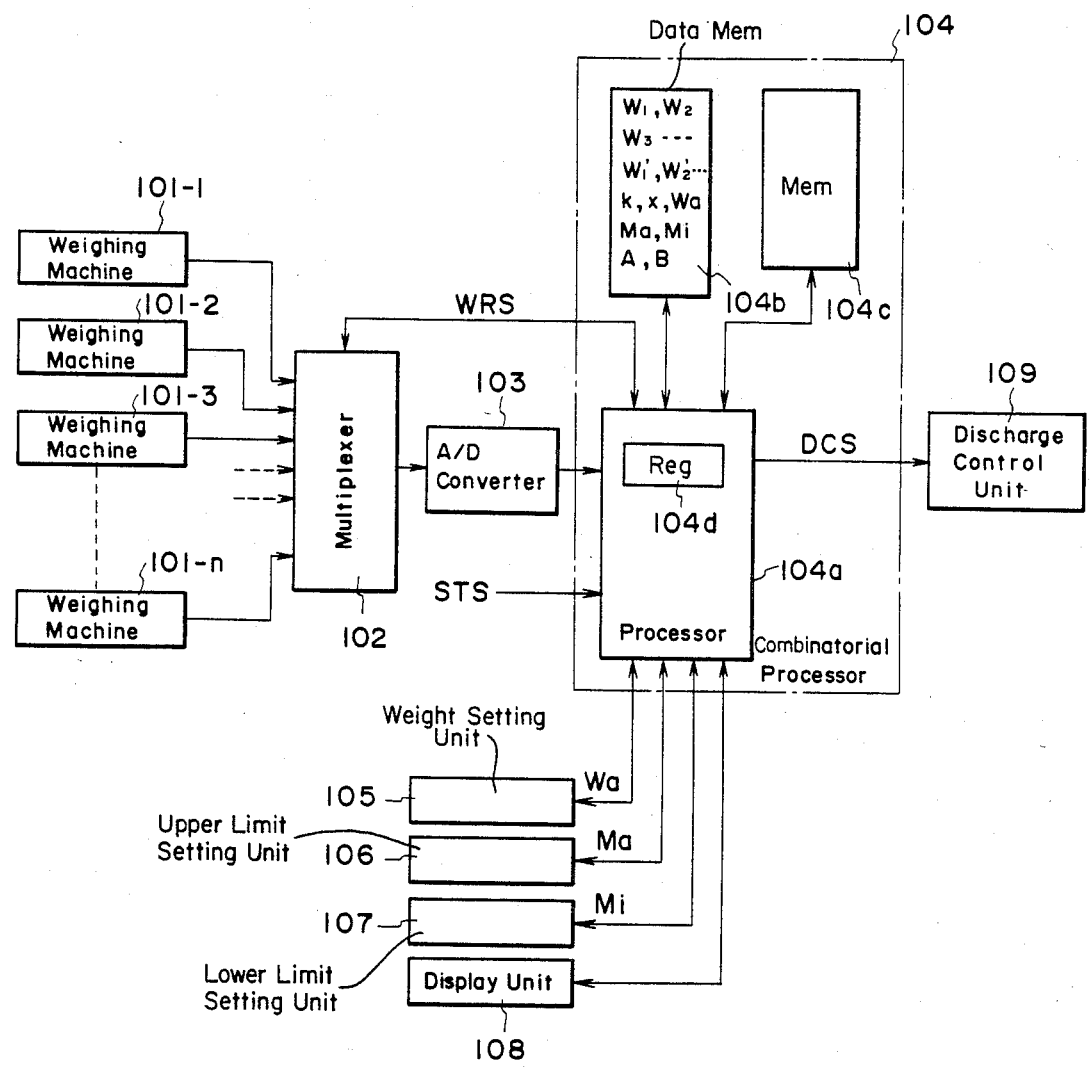
FIG. 4 is a block diagram of an arrangement for practicing the combinatorial weighing method of the present invention.
Figure 5:
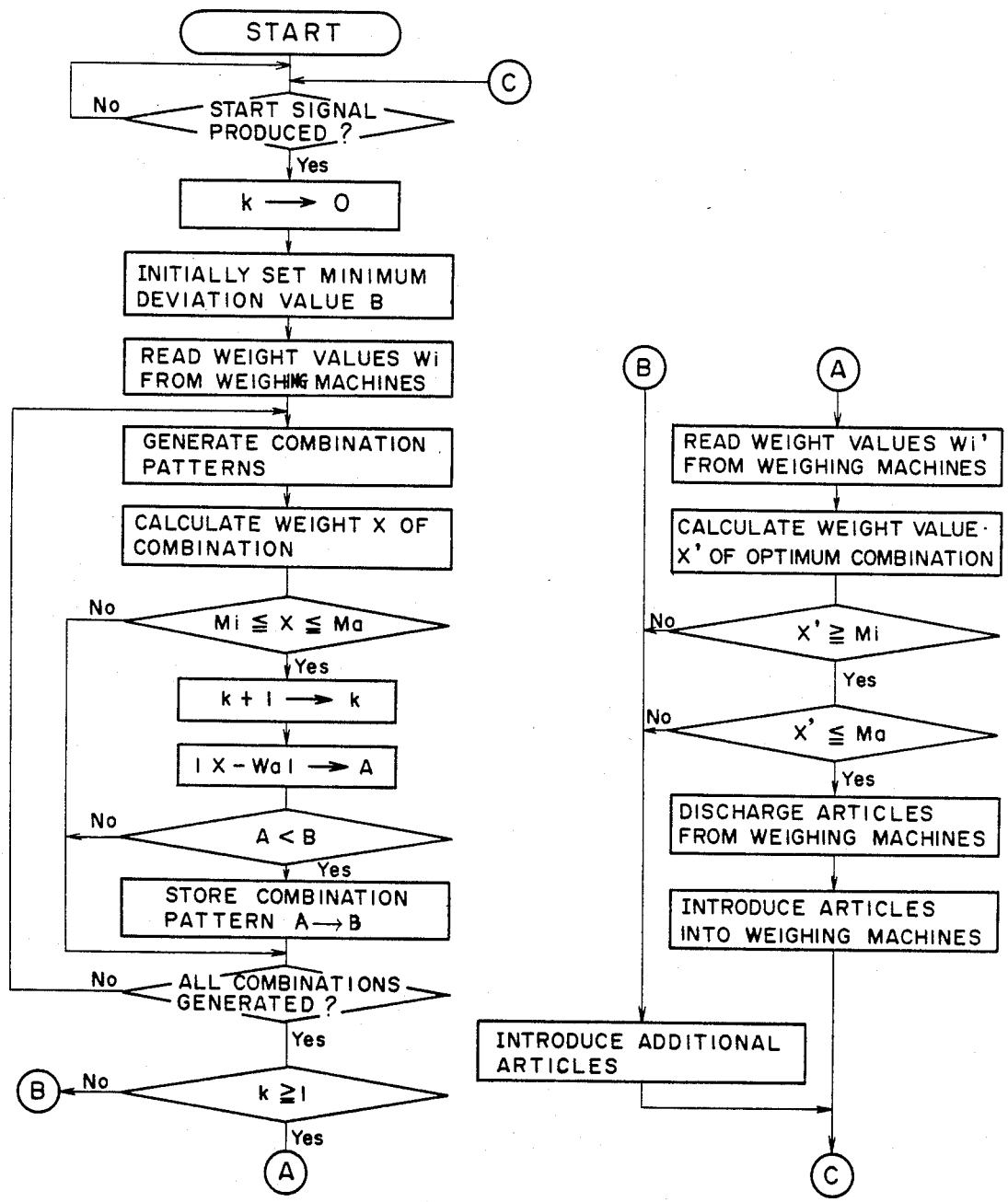
FIG. 5 is a flowchart for the processing associated with the present invention.

A block diagram of a weighing apparatus for practicing the combinatorial weighing method of the present invention is illustrated in FIG. 4. FIG. 5 is a flowchart for the processing associated with the apparatus of FIG. 4.

In FIG. 4, numerals 101-1, 101-2 . . . 101-n denote weighing machines of which there are n in number, each comprising a weighing hopper and weight sensor for measuring the weight of a batch of articles supplied thereto. Weight values Wi (i=1, 2, ... n) produced by the weighing machines 101-1, 101-2, . . . 101-n are applied to a multiplexer 102, constituted by, e.g., an analog switch, which delivers the weight values in sequential fashion in response to a weight read signal WRS, described below. An analog-to-digital (A/D) converter 103 converts each analog weight value Wi, delivered by the multiplexer 102, into a digital value. The digital output of the A/D converter 103 is applied to a combinatorial processing unit 104 having the construction of a microcomputer. The latter includes a microprocessor (central processor) 104a which receives the output of the A/D converter 103, a data memory 104b comprising a RAM (random-access memory), and a memory 104c storing a combinatorial processing program. A weight setting unit 105 sets a target weight value Wa, which is applied to the processor 104a. Numeral 106 denotes an upper limit setting unit, and 107 a lower limit setting unit. The units 106, 107 are for establishing set allowable limits (an upper limit Ma and a lower limit Mi) for the total weight value of a combination. It should be noted that the lower limit value Mi customarily is set equal to the target weight value Wa. The reason is that setting Mi below the target weight value can have the unfortunate result of producing a weight shortfall under certain circumstances. Numeral 108 denotes a display unit for displaying the total weight of a combination, the weighing machines selected, improper weights, etc. Numeral 109 denotes a discharge control unit.

The weighing operation performed by the apparatus shown in FIG. 4 will now be described in conjunction with the flowchart of FIG. 5.

Figure 1:
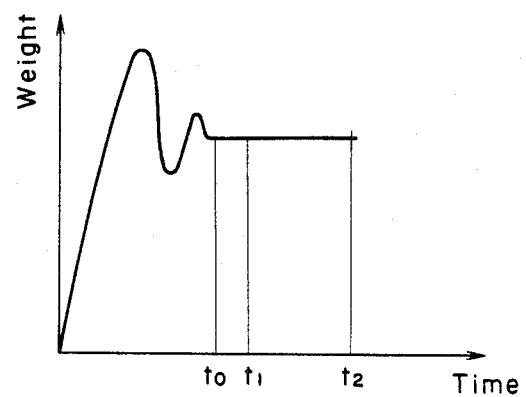
FIGS. 1 and 2 are graphs useful in describing the relation between a weight value produced as an output by a weighing machine, and time which has elapsed since introduction of articles to the weighing machine.

(a) When a packaging machine (not shown) generates a start signal (timing signal) STS, the signal is read by the processor 104a. Upon detecting the generation of the start signal STS, the processor 104a sets to zero a numerical value k stored in the data memory 104b, and initially sets a minimum deviation value B to a predetermined number. In addition, the processor 104a delivers the weight value read signal WRS to the multiplexer 102 at time $t_1$, which is shown in FIG. 1. The multiplexer 102 responds by successively applying the weight values Wi (i=1, 2 ... n) to the AD converter 103, which proceeds to convert each weight value Wi into a digital quantity that the processor 104a stores in the data memory 104b.

(b) Thereafter, the processor 104a generates $2^n-1$ combination patterns, one after another, under the control of the combinatorial processing program. The $2^n-1$ combination patterns are generated in the following manner. Specifically, the processor 104a has an internal general-purpose register 104d. Correspondence is established between the first bit of the register 104a and the first weighing machine (weight value W1), the second bit and the second weighing machine (W2), and so on through the n-th bit, which corresponds to the n-th weighing machine (weight value Wn). Then, when the general-purpose register 104d is incremented from 1 to $2^n-1$, the result will be the generation of $2^n-1$ combination patterns 0000 . . . 001 through 1111 . . . 111.

The processor 104a is adapted to add the weight values corresponding to the "1" bits in each of the combination patterns to calculate the total weight value X ($=\Sigma Wi$) of each and every combination. Accordingly, in response to generation of the first combination pattern 0000 . . . 001, the processor 104a calculates X (=W1) and stores this value in the data memory 104b.

(c) The processor 104a then determines whether the total weight X of the combination falls within the range given by:

$$Mi \leq X \leq Ma \qquad (1)$$

If X satisfies Eq. (1), then the processor 104a performs the operation:

$$k+1 \rightarrow k \qquad (2)$$

and calculates the absolute value of the difference between the total weight X of the combination and the target weight value Wa. In other words, the processor calculates the difference A by performing the following operation:

$$|X-Wa| \rightarrow A \qquad (3)$$

(d) The processor then compares the magnitude of the difference A with the magnitude of the minimum deviation value B stored in the data memory 104b and, if A<B holds, replaces the value of the minimum deviation B with the value of the difference A by performing the operation A→B, and stores the bit pattern 0000 . . . 001 in the data memory 104b as a combination pattern which, up to the present point in time, is the optimum combination. Note that in a case where the lower limit value is set equal to the target weight value, the difference between the upper limit value Ma and the target weight value Wa is initially preset in the data memory 104b as the minimum deviation value B.

(e) Thereafter, or where X does not satisfy Eq. (1), or where A≧B holds, it is determined whether all possible combination patterns have been generated. Where this is not the case, the general-purpose register 104d is incremented and the second combination pattern 0000 . . . 010 is generated.

(f) From this point onward, the foregoing processing is repeated until all combination patterns are generated, thereby ending combinatorial processing. When this is accomplished, the processor 104a determines whether the following holds:

$$k \geq 1 \tag{4}$$

If it does not, then the processor causes the display unit 108 to present an alarm indication, which signifies failure to obtain a combination the total weight value of which is within the set allowable limits. The processor also executes step (1), described below.

(g) If Eq. (4) is found to hold, this means that an optimum combination has been obtained. The processor 104a again delivers the weight value read signal WRS to the multiplexer at time $t_2$ (FIG. 1), in response to which weight values Wi' (i=1, 2, ... n), which are the currently prevailing outputs of the weighing machines 101-1, ... 101-n, are read and stored in the data memory 104b.

(h) The processor 104a then adds the weight values Wi' corresponding to the "1" bits in the above-mentioned optimum combination pattern stored in the data memory 104b, thereby calculating the total weight value X' of this combination.

(i) When the total weight value X' of the combination has been calculated, the processor determines whether X' falls within the range given by:

$$Mi \leq X' \leq Ma \tag{5}$$

In other words, the processor determines whether X' lies within the set allowable limits.

(j) If the result of step (i) is that X'<Mi holds, the display unit 108 presents an alarm display indicative of a weight shortfall, and step (1), described below, is executed. If Ma<X' is found to hold, on the other hand, then the display unit 108 presents an alarm display indicative of excessive weight, and step (1) is executed.

(k) If Mi≦X'≦Ma (Eq. (5)) is found to hold, then the processor delivers the optimum combination pattern to the discharge control unit 109, which responds by causing the weighing machines corresponding to the "1"s in the pattern to discharge their articles. The weighing machines which have discharged their articles are subsequently supplied with articles by the corresponding pool hoppers. The system then awaits the start signal from the packaging machine, which is not shown.

(l) If Eq. (4) or Eq. (5) fails to hold, the pool hopper gates 1c corresponding to certain weighing machines, such as weighing machines each of which produces a weight value less than a predetermined weight value, are opened to provide these weighing machines with additional articles. The system then awaits the start signal.

Thereafter, whenever the start signal is generated, the steps (a) through (1) are executed to perform combinatorial weighing automatically. Further, in steps (g) and (h), the total weight value X' of the combination can be calculated by again reading the weight values Wi' solely from the weighing machines corresponding to the "1" bits of the optimum combination pattern obtained, storing these values in the data memory 104b, and then adding the stored weight values Wi'.

It is also possible to calculate the total weight value X' in steps (g) and (h) by again reading the weight values Wi' solely from the weighing machines corresponding to the "1" bits of the optimum combination pattern obtained, and adding the weight values Wi' together each time one is read. Such an arrangement will make it unnecessary to store each re-read weight value Wi' in the data memory 104b.

Figure 2:
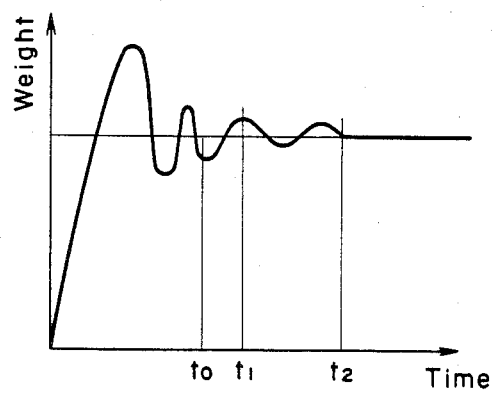

Thus, the present invention provides a combinatorial weighing method which includes performing combinatorial processing based on weight values $W_i$ read at a time $t_1$, reading weight values Wi' from the weighing machines again at a time $t_2$ following combinatorial processing, adding weight values Wi' corresponding to the "1" bits in an optimum combination pattern obtained by the combinatorial processing, thereby calculating the total weight value X' of the combination, and discharging articles from weighing machines on the basis of the optimum combination pattern when the total weight value X' of the combination lies within set allowable limits. According to the present invention, the weight of a combination of articles to be discharged can be held within set allowable limits in reliable fashion even if the output values produced by the weighing machines oscillate at time t1, as shown in FIG. 2, due to the influence of external vibration or the like. The reason is that the output values from the weighing machines will be substantially stable at time $t_2$.

Since the only additional steps entailed by the invention are steps of (A) calculating the total weight value X' based on the optimum combination pattern using the weight values Wi' read at time $t_2$, and (B) executing the decision regarding Eq. (5), the time required for processing differs little from that demanded by the prior art.

As many apparently widely different embodiments of the present invention can be made without departing from the spirit and scope thereof, it is to be understood that the invention is not limited to the specific embodiments thereof except as defined in the appended claims.

What we claim is:

1. A combinatorial weighing method in which weight values produced by respective ones of a plurality of weighing machines containing articles are combined, an optimum combination having a total weight equal to a target weight value or closest to the target value within set allowable limits is obtained, and the articles are discharged from those weighing machines corresponding to the optimum combination obtained, said method comprising the steps of:

(a) obtaining the optimum combination by performing combinatorial processing using weight values produced by the weighing machines at a predetermined first point in time following introduction of the articles into the weighing machines;

(b) obtaining the total weight of the obtained optimum combination again by using weight values produced by the weighing machines again at a second point in time;

(c) determining whether the total weight value of the optimum combination, obtained the second time in said step (b), lies within the set allowable limits; and (d) discharging the articles from those weighing machines corresponding to the optimum combination if the result of said step (c) is that the total weight value obtained the second time in said step (b), lies within the set allowable limits.

2. The combinatorial weighing method according to claim 1, further comprising the steps of:

(e) supplementing weighing machines which produce weight values below a predetermined weight value, with articles; and (f) repeating steps (a) through (c) if the total weight value obtained the second time in said step (b) is determined to fall outside the set allowable limits in said step (c).

3. The combinatorial weighing method according to claim 2, further comprising the step of (g) presenting an alarm display if the total weight value obtained the second time in said step (b) is determined to fall outside the set allowable limits in said step (c).

4. A combinatorial weighing apparatus in which weight values produced by respective ones of a plurality of weighing machines containing articles are combined, an optimum combination having a total weight equal to a target weight value or closest to the target weight value within set allowable limits is obtained, and the articles are discharged for those weighing machines corresponding to the optimum combination obtained, said apparatus comprising:

means for obtaining the optimum combination by performing combinatorial processing using weight values produced by the weighing machines at a predetermined first point in time following introduction of the articles into the weighing machines;

means for reading weight values from the weighing machines again at a second point in time, and for obtaining the total weight value of the obtained optimum combination again by using the weight values read at the second point in time;

means for determining whether the total weight value of the optimum combination obtained by using the weight values read at the second point in time, lies within the set allowable limits; and means for discharging the articles from those weighing machines corresponding to the optimum combination if said determining means determines that the total weight value obtained by said reading means lies within the set allowable limits.

5. The combinatorial weighing apparatus according to claim 4, wherein at least said means for obtaining the optimum combination and said means for obtaining the total weight value of the obtained optimum combination are formed by a microprocessor and memory.

6. The combinatorial weighing apparatus according to claim 4, further comprising:

means for setting the target weight value;

means for setting an upper limit value; and means for setting a lower limit value, the upper limit value and the lower limit value defining the set allowable limits.

7. A combinatorial weighing method for use with a plurality of weighing machines, comprising the steps of:

(a) charging the weighing machines with respective batches of articles;

(b) detecting, at a first time following said charging step (a), first weight values respectively corresponding to the weights of the batches of articles charged in the weighing machines;

(c) performing combinatorial processing using the first weight values to obtain an optimum combination of the first weight values having a first total weight value equal to a target weight value or closest to the target weight value within set allowable limits;

(d) reading second weight values corresponding to the first weight values of the weighing machines forming the optimum combination in said step (c);

(e) calculating a second total weight value corresponding to the sum of the second weight values of the optimum combination;

(f) determining whether the second total weight value calculated in said step (e) lies within the set allowable limits; and (g) discharging articles from the weighing machines corresponding to the optimum combination if the result of said step (f) is that the second total weight value lies within the set allowable limits.

8. The combinatorial weighing method according to claim 7, further comprising the steps of:

(h) charging the weighing machines which produce second weight values below a predetermined weight value, with articles when it is determined that the second total weight value does not lie within the set allowable limits; and (i) repeating steps (b) through (f) if the second total weight value is determined to fall outside the set allowable limits in said step (f).

9. The combinatorial weighing method according to claim 8, further comprising the step of:

(j) displaying an alarm signal if the second total weight value obtained in said step (e) is determined to fall outside the set allowable limits in said step (f).

* * * * *